Aug. 26, 1941.   E. G. BEIKIRCH   2,253,751
PHOTOGRAPH MOUNT
Filed July 2, 1940

INVENTOR
EDWARD G. BEIKIRCH
BY
ATTORNEY

Patented Aug. 26, 1941

2,253,751

UNITED STATES PATENT OFFICE 2,253,751

PHOTOGRAPH MOUNT

Edward G. Beikirch, Rochester, N. Y., assignor to J. S. Graham Company, Inc., Rochester, N. Y., a corporation of New York Application July 2, 1940, Serial No. 343,586

1 Claim. (Cl. 40—152.1)

This invention relates to photo mounts provided with easel supports for the display of the picture in the mount and the principal object is to provide such a mount with novel locking means with which the picture is automatically locked in place in the mount on its support by the easel portion thereof.

This and other objects and attendant advantages of the invention will become more readily apparent from the detailed description which follows, reference being had to the accompanying drawing in which Figure 1 is a front elevation of the photo mount embodying my invention as it appears in the position in which it is used for the display of a picture.

Figure 1:
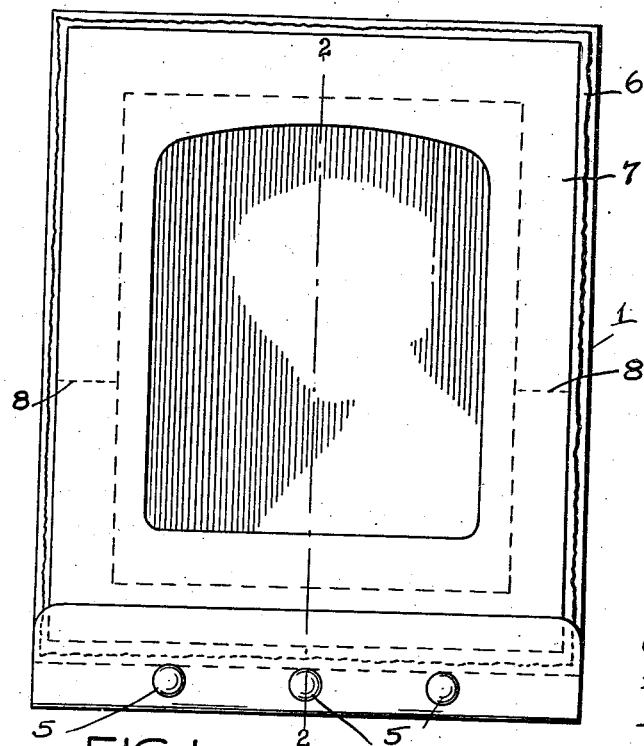

My present invention is especially adapted for a quick and easy location of the picture in the mount and the automatic locking of it in place therein on the display thereof. For this purpose the mount comprises a back panel 1, the supporting brace 2, the strut 3 and the clamping or locking pocket 4. All of these members are formed from a single piece of material such as is commonly used in the manufacture of photo mounts, and score lines A, B, C and D divide the single piece of material into the members above enumerated. The front and back of the clamping or locking pocket 4 are held together by a series of clamping rivets 5, 5 which draw the open sides of the pocket together so that the open end thereof exerts a yielding pressure against the portion of the members which are inserted thereinto.

Figure 2:
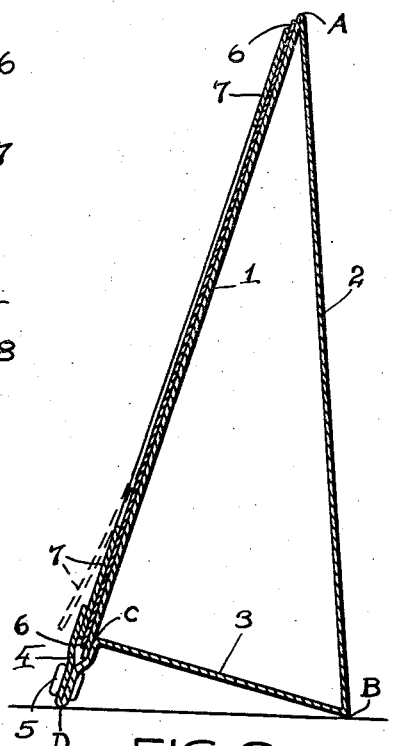
Figure 2 is a vertical sectional view of the photo mount taken on the line 2—2 of Figure 1.
Figure 3:
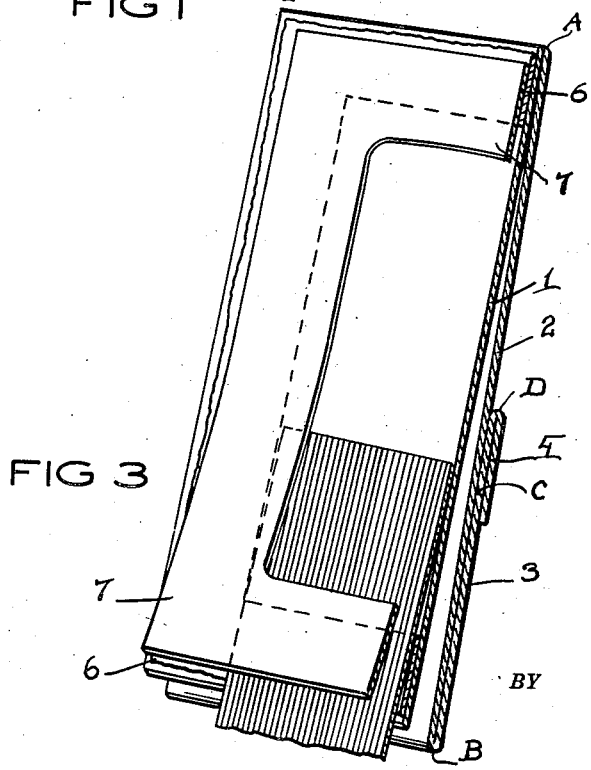
Figure 3 is a partial perspective and sectional view of the photograph mount as it appears in process of having a picture inserted therein.

The photo mount proper is provided by a cut out underlay 6 which is permanently attached to the face of the back panel 1. The underlay is cut out so as to receive the size picture which is adapted to be held in place in the photo mount. A cut out mask 7 is placed over the underlay 6 and is permanently attached to it with its upper portion beginning at the substantially dotted lines 8, 8 in Figure 1. In this way the lower portion of the cut out mask is free to be drawn away from the underlay 6 as illustrated in Figures 2 and 3. In so doing the picture E to be mounted may be readily slipped under the mask at the bottom of the photo mount and moved up between it and the underlay until it is properly located in the cut out portion of the underlay. The loose mask portion is then allowed to swing back into position over the underlay. Then for the purpose of fixedly holding the loose portion of the mask over the underlay in order to permanently lock the picture in place in the mount, the bottom edge of the back panel with the bottom edges of the underlay and the mask are wedged into the clamping pocket 4 so as to have the sides of the pocket hold the loose bottom portion of the mask yieldingly against the underlay and against the picture located in its cut out portion.

In this way the novel photo mount is adapted to quickly and easily have a picture properly located and mounted therein and then have the picture locked in place without the aid of adhesive or other separate fastening means. The display of the picture by extending the photo mount to make it self supporting thus automatically holds and locks the picture in place in the mount.

I claim:

In a photo mount embodying a brace for the support of the top and a strut for the support of the bottom with an elongated pocket provided at the forward end of the strut, the combination of a back panel connected to said brace, a cutout underlay on said back panel, a cutout mask on top of said underlay with its top portion held fixed over the underlay and its bottom portion movable toward and away from the underlay, and means for yieldingly connecting the sides of the elongated pocket for collective engagement of the bottom edges of the back panel, the underlay and the mask into said pocket and for the fixed mounting of a picture between the unattached bottom portion of the mask and the back panel.

EDWARD G. BEIKIRCH.